United States Patent [19]

Hussain

[11] Patent Number: 5,050,451
[45] Date of Patent: Sep. 24, 1991

[54] TRANSMISSION LUBRICANT TEMPERATURE/VISCOSITY DETERMINATION METHOD/APPARATUS

[75] Inventor: Syed F. Hussain, Kalamazoo, Mich.

[73] Assignee: Eaton Corporation, Cleveland, Ohio

[21] Appl. No.: 591,305

[22] Filed: Oct. 1, 1990

[51] Int. Cl.$^5$ .................................................. B60K 41/18
[52] U.S. Cl. ........................................ 74/844; 74/862; 364/424.1
[58] Field of Search ................ 74/844, 862; 364/424.1

[56] References Cited

U.S. PATENT DOCUMENTS

| | | | |
|---|---|---|---|
| 3,221,851 | 12/1965 | Vandervoort | 192/53 |
| 4,361,060 | 7/1982 | Smyth | 74/866 |
| 4,497,396 | 10/1985 | Davis | 192/53 |
| 4,527,447 | 4/1985 | Richards | 74/866 |
| 4,566,354 | 7/1986 | Kumura et al. | 74/866 |
| 4,572,029 | 10/1986 | Kinugasa et al. | 74/866 |
| 4,576,065 | 11/1986 | Speranza et al. | 74/866 |
| 4,595,986 | 4/1986 | Daupenspeck et al. | 364/424.1 |
| 4,648,290 | 6/1987 | Dunkley et al. | 74/866 |
| 4,754,665 | 3/1988 | Vandervoort | 74/745 |
| 4,779,489 | 1/1988 | Haley | 74/844 |
| 4,894,780 | 1/1990 | Simonyi et al. | 364/424.1 |

Primary Examiner—Dirk Wright
Attorney, Agent, or Firm—H. D. Gordon

[57] ABSTRACT

A control method/system for sensing cold temperature/high viscosity conditions of a transmission lubricant sump (78) in an automated mechanical transmission system (10) without requiring a dedicated temperature sensor and the required CPU input port and input signal processing capacity associated therewith is provided.

18 Claims, 4 Drawing Sheets

TRANSMISSION LUBRICANT TEMPERATURE/VISCOSITY DETERMINATION METHOD/APPARATUS

BACKGROUND OF THE INVENTION

1. Field of the Invention

The present invention relates to a method and apparatus for determining the temperature and/or viscosity of transmission lubricant. In particular, the present invention relates to a method/apparatus, preferably at system start-up, without requiring a temperature probe, to determine the temperature and/or viscosity of lubricant in a transmission lubricant sump of a fully or partially automated transmission system.

2. Description of the Prior Art

Change gear mechanical transmissions (i.e. transmissions shifted by engaging and disengaging selected jaw clutches), both synchronized and nonsynchronized, which operate with all or many of the gears submerged in a lubricant sump are well known in the prior art. Examples of such transmissions may be seen by reference to U.S. Pat. Nos. 4,497,396; 3,221,851; 4,754,665 and 4,735,109, the disclosures of which are hereby incorporated by reference.

Automatic and partially automatic mechanical transmission systems wherein the operation of mechanical transmissions is at least partially automated, usually by means of sensors providing input signals to a central control unit (usually microprocessor based) which processes the signals in accordance with predetermined logic rules to issue command output signals to actuators, are also well known in the prior art as may be seen by reference to U.S. Pat. Nos. 4,676,115; 4,361,060; 4,527,447; 4,576,065 and 4,595,986, the disclosures of which are hereby incorporated by reference.

It is known that in extremely cold weather situations, until the vehicle has been warmed up, the very high viscosity of transmission lubricant due to initial low temperature thereof alters the manner in which the transmission should be operated. For example, in an automated synchronized transmission, the increased drag on the gearing caused by high lubricant viscosity often makes downshifts difficult or impossible to complete and/or undesirably time-consuming, unless the manner and sequence by which the shift is commanded is altered. Examples of transmission systems wherein transmission lubricant temperature is a control input may be seen by reference to U.S. Pat. Nos. 4,566,354; 4,572,029 and 4,799,489, the disclosures of which are hereby incorporated by reference.

The prior art automated transmission systems having lubricant sump temperature inputs were not totally satisfactory as a separate temperature probe or sensor, submerged in or adjacent to the lubricant sump was required. Aside from the added device, connector, and assembly cost, complexity and increased probability of a failure, an added dedicated sump temperature sensor also requires a dedicated CPU input port and add CPU dedicated input processing capacity.

SUMMARY OF THE INVENTION

In accordance with the present invention, the drawbacks of the prior art have been minimized or overcome by providing a method/apparatus for sensing transmission lubricant sump temperature/viscosity, or at least temperature/viscosity above or below a predetermined reference value, in an automated mechanical transmission system having at least one shaft speed sensor.

Typically, an automatic mechanical transmission system will have a CPU for receiving input signals from an input shaft and an output shaft speed sensor and will have engine, master clutch and transmission shifting mechanism actuators controlled by command output signals issued by the CPU. During appropriate times, such as during vehicle start-up when cold highly viscous lubricant is most likely, the transmission is shifted to or confirmed as in neutral, the input shaft is caused to rotate at at least a given rotational speed, the master clutch is disengaged and deceleration of the shaft is sensed/calculated. For a given transmission using a specified grade of transmission lubricant, the deceleration rate of the shaft is an accurate indication of sump temperature, or at least of "cold" or "not cold" conditions.

Accordingly, a method/apparatus for accurately determining transmission lubricant temperature/viscosity in an automated mechanical transmission system is provided which requires no additional dedicated sensors, CPU input ports or CPU input signal processing capacity.

This and other objects and advantages of the present invention will become apparent from a reading of the detailed description of the preferred embodiment taken in connection with the attached drawings.

DESCRIPTION OF THE PREFERRED EMBODIMENT

Figure 1:
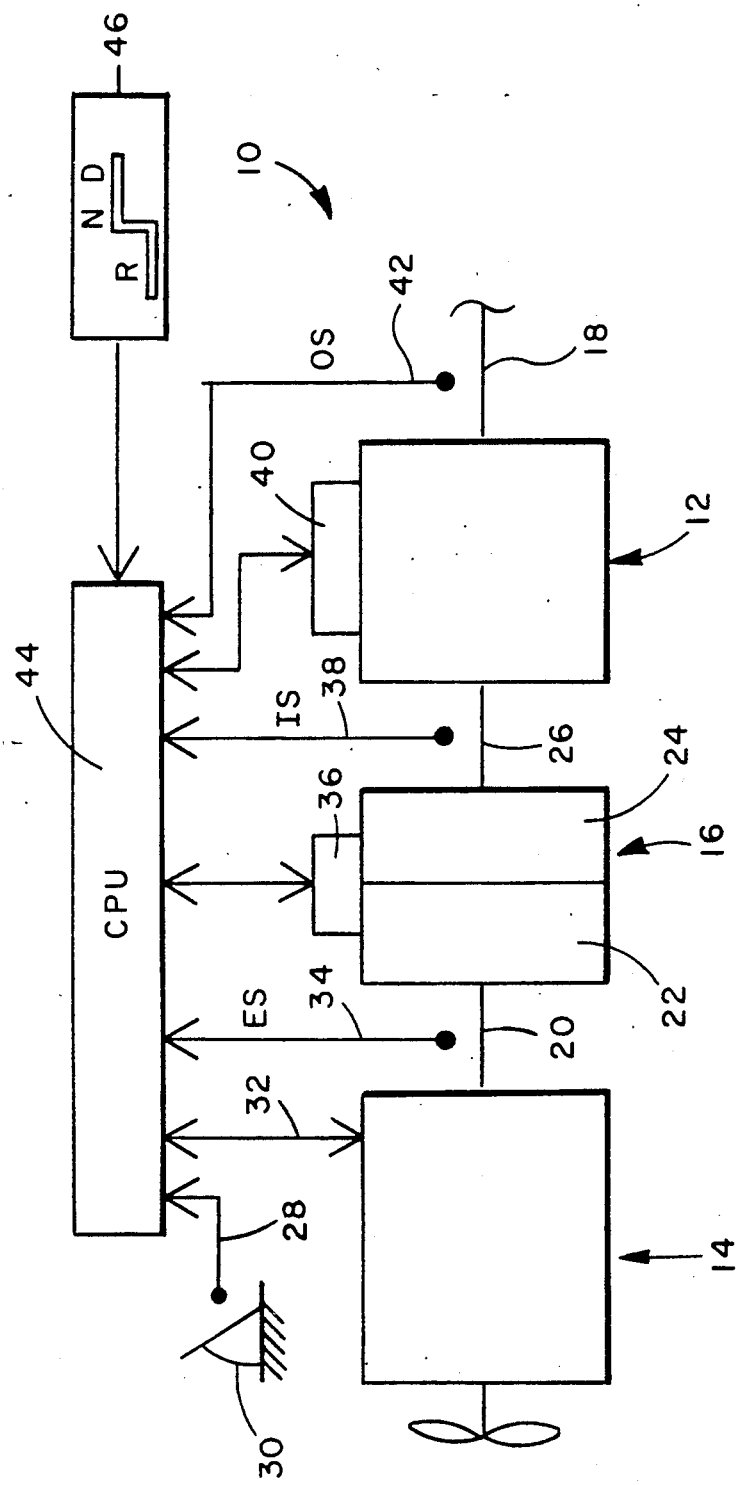
FIG. 1 is a schematic illustration of an automated mechanical transmission system of the type particularly well suited to be controlled by the method/apparatus of the present invention.

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly", refer to directions towards and away from, respectively, the geometric center of the device and designated parts thereof. The above applies to the words above specifically mentioned, derivatives thereof and words of similar import.

FIG. 1 schematically illustrates a vehicular automated mechanical transmission system 10 including an automated multi-speed change gear transmission 12 driven by a fuel controlled engine 14, such as a well-known diesel engine, through a coupling such as master friction clutch 16. The output of automated transmission 12 is output shaft 18 which is adapted for driving connection to an appropriate vehicle component such as the differential of a drive axle, a transfer case, or the like, as is well known in the prior art.

The crank shaft 20 of engine 14 will drive the driving plates 22 of master friction clutch 16 which are frictionally engageable to driven plates 24 for driving the input shaft 26 of transmission 12.

The above-mentioned power train components are acted upon and/or monitored by several devices, each of which will be discussed briefly below. These devices will include a throttle pedal position or throttle opening monitor assembly 28 which senses the operator set position of the operator controlled throttle device 30, a fuel control device 32 for controlling the amount of fuel to be supplied to engine 14, and engine speed sensor 34 which senses the rotational speed of the engine, a clutch operator 36 which engages and disengages master clutch 16 and which may also provide information as to the status of the clutch, an input shaft speed sensor 38 for sensing the rotational speed of transmission input shaft 26, a transmission operator 40 which is effective to shift the transmission 12 into a selected gear ratio and to provide a signal indicative of the gear neutral condition and/or the currently engaged gear ratio, and an output shaft speed sensor 42 for sensing the rotational speed of the output shaft 18.

The above-mentioned devices supply information to and/or accept commands from the central processing unit or control 44. The central processing unit 44 may include analog and/or digital electronic calculation and logic circuitry as is known in the prior art. The central processing unit 44 will also receive information from a shift control assembly 46 by which the vehicle operator may select a reverse (R) neutral (N) or forward drive (D) mode of operation of the vehicle. An electrical power source (not shown) and/or a source of pressurized fluid (not shown) provides electrical and/or pneumatic power to the various sensing, operating and/or processing units.

Drive train components and controls therefor of the type described above are known in the prior art and may be appreciated in greater detail by reference to above-mentioned U.S. Pat. Nos. 4,959,986; 4,576,065; 4,445,393. The sensors 28, 34, 36, 38, 42 and 46 may be of any known type of construction for generating analog or digital signals proportional to the parameter monitored thereby. Similarly, operators 32, 36 and 40 may be of any known electric pneumatic or electro-pneumatic type for executing operations in response to command output signals from the central processing unit 44.

In addition to direct inputs, the central processing unit 44 may be provided with circuitry for differentiating the input signal from at least sensor 38 to provide a calculated signal indicative of the acceleration and/or deceleration of the transmission input shaft 26. The CPU 44 may also be provided with circuitry and/or logic rules to compare the input signals of sensors 38 and 42 to verify and identify that the transmission 12 is engaged in a particular gear ratio, etc.

Figure 2:
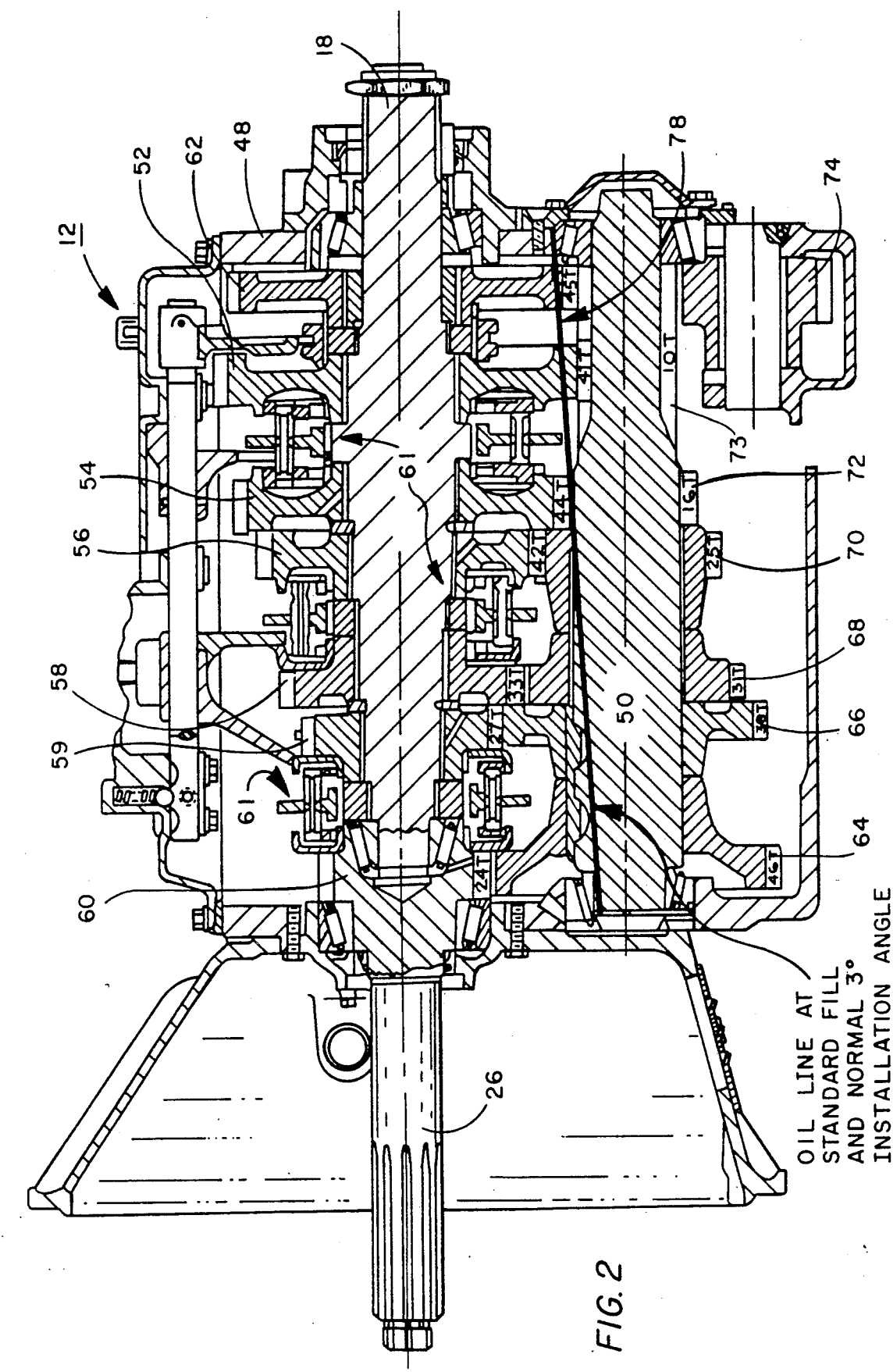
FIG. 2 is a partial elevational view, in cross-section, illustrating a typical synchronized change gear transmission utilizing a lubricant sump in a splash type lubrication system.

FIG. 2 is a cross-sectional view of a typical synchronized change gear transmission 12 of the type automated in automated mechanical transmission system 10. Briefly, the transmission 12 includes a transmission housing 48 which will typically support the transmission input shaft 26, the transmission output shaft 18 and a transmission countershaft 50. A selected one of the drive gears 52, 54, 56, 58, or 59 or input gear 60 may be coupled to the output shaft 18 by means of the synchronized jaw clutch assemblies 61 to provide the selected forward drive ratio while reverse gear 62 may be selectably coupled to the output shaft 18 to provide reverse operation. The input gear 60, which is coupled to the input shaft 26, is constantly engaged with a countershaft drive gear 64 for rotating countershaft 50 and the countershaft gears 66, 68, 70, 72, 73 and idler gear 74, all of which gears are in constant mesh with the drive gears. Accordingly, rotation of input shaft 26 will resolve in rotation of all of the countershaft and drive gears therewith.

Line 78 indicates the level to which the transmission sump is normally filled with transmission lubricant (at the normal 3° installation angle in a vehicle). Accordingly, the countershaft gears, and some of the low speed drive gears, are constantly turning within the lubricant sump.

In extremely cold weather start-up conditions, i.e. when the transmission lubricant is at a relatively high viscosity, the extremely high resistance to rotation of the drive gears 52, 54, 56, 58 and 59 will make downshifting of the transmission an extremely difficult and/or time consuming operation which may require modification of the predetermined logic rules by which CPU 44 processes input signals to generate command output signals to the various system actuators. Accordingly, it is desirable to provide a means by which the CPU can determine the temperature/viscosity of the transmission lubricant sump. Determining the temperature/viscosity of the lubricant sump is particularly desirable at system start-up conditions when the action of the gearing churning in the sump has not yet had a chance to raise the temperature and lower the viscosity thereof.

In accordance with the present invention, a control method/control apparatus allowing determination of the transmission lubricant sump temperature/viscosity or at least a determination if lubricant sump temperature/viscosity is greater or less than a predetermined reference value, has been devised which requires no additional sensors, nor additional CPU input ports nor additional CPU input signal processing capacity. The above method or procedure is preferably performed as a part of the system start up or initiation procedure. The master clutch 16 is disengaged, the transmission 12 is shifted to and verified as being in neutral, the master clutch 16 is re-engaged, and the engine 14 is fueled until the input shaft is sensed as rotating at at least a predetermined minimum rotational speed. The master clutch is then disengaged and the engine is defueled. The CPU will then sense or calculate the deceleration rate (dIS/dt) of the input shaft 26. The measured or calculated deceleration of the input shaft is then compared to a reference value, and, if the deceleration rate exceeds a reference deceleration rate, i.e. if dIS/dt is less than the reference this is taken as an indication that the lubricant sump temperature is below a predetermined value and it is required that cold weather logic routines be utilized. Accordingly, the CPU will adapt cold weather logic.

The cold weather logic shift routines/shift sequences will be utilized until either the above procedure is again implemented and indicates that the lubricant sump temperature is greater than the predetermined minimum reference value or until the passage of a predetermined period of time. The period of time T is selected to assure that continued vehicle operation including churning of the gearing through the lubricant sump has had sufficient time to raise the temperature of the sump above the predetermined minimum value. The period of time selected may also be variable with the sensed value of deceleration of the input shaft.

Figure 3:
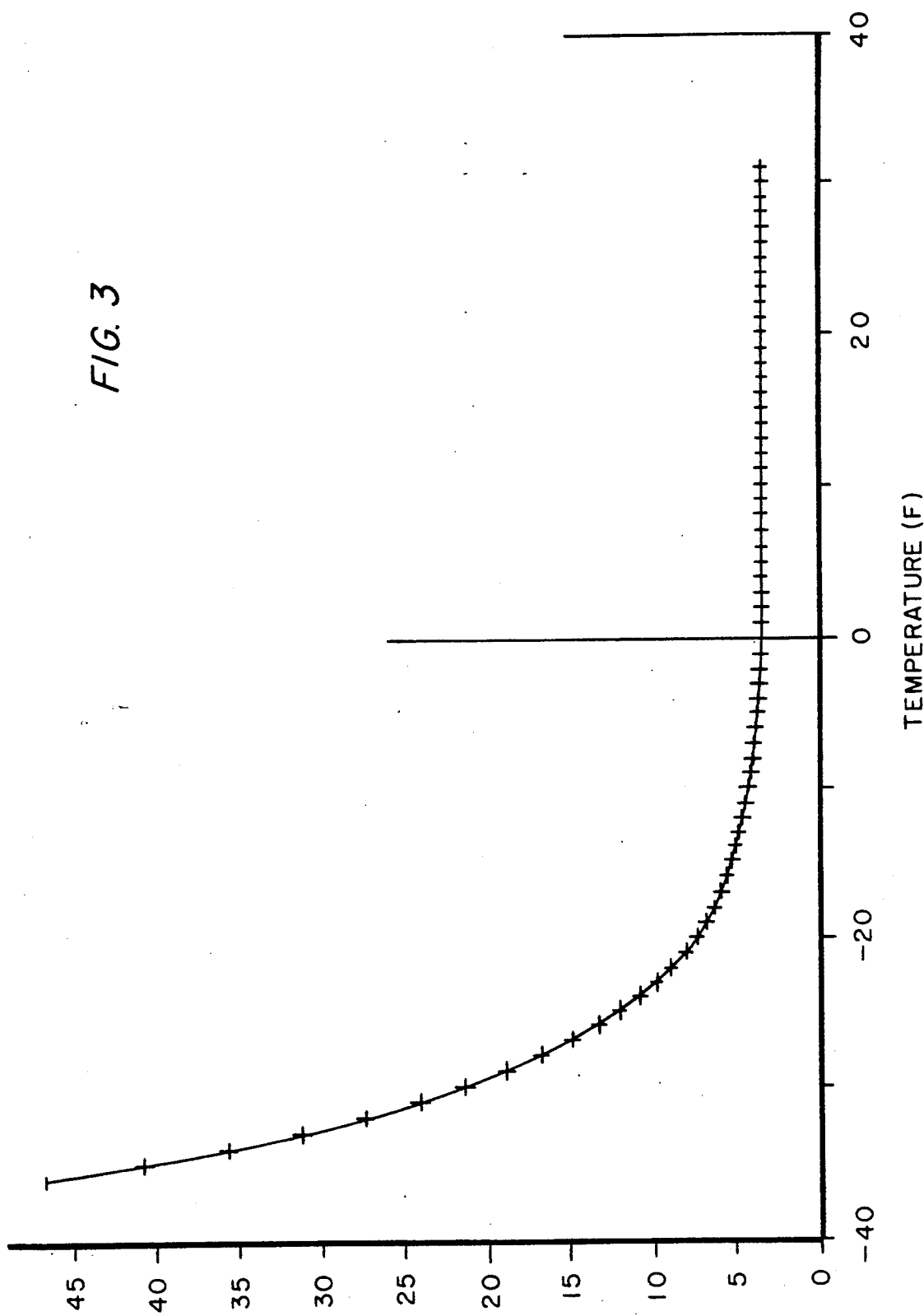
FIG. 3 is a graphical representation of the relationship between monitored input shaft deceleration and lubricant sump temperature empirically determined for a particular transmission utilizing a particular specification of transmission lubricant.
Figure 4:
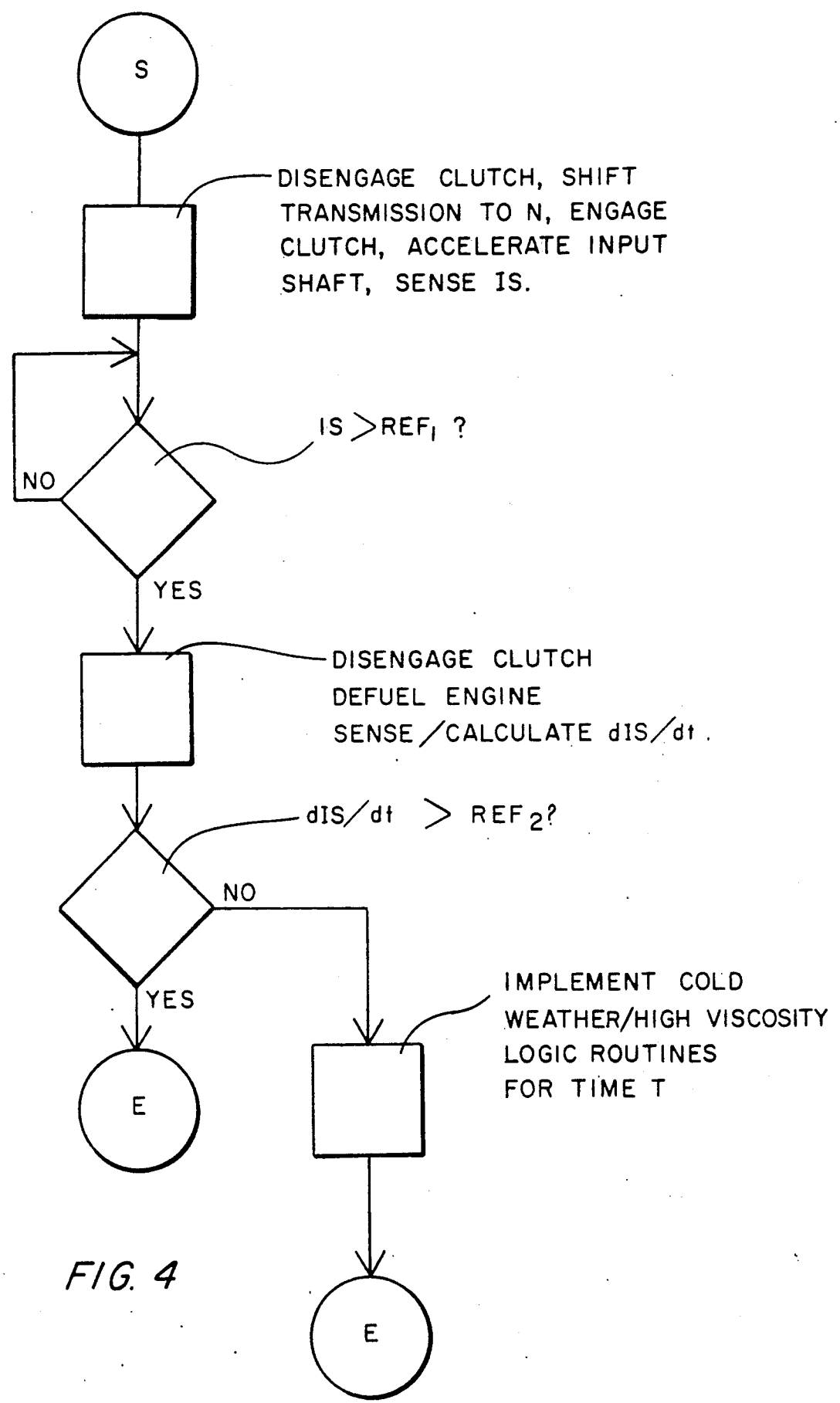
FIG. 4 is a graphical representation, in flow chart format, of the control methods/apparatus of the present invention.

Referring to FIG. 3, it may be seen that for a particular transmission structure utilizing a particular type of transmission lubricant, it is possible to determine by empirical means a very accurate correlation between transmission input shaft deceleration and transmission lubricant sump temperature, at least below a predetermined temperature.

Accordingly, it may be seen that a new and improved transmission control procedure/apparatus is provided which allows determination of the temperature/viscosity of the transmission lubricant sump, or at least determination of "cold"/"not cold" conditions of the transmission lubricant sump without requiring additional dedicated sensors, nor dedicated sensor input terminals nor input signal processing capacity.

Although the present invention has been described with a certain degree of particularity, it is understood that various modifications are possible without departing from the spirit and the scope of the invention as hereinafter claimed.

I claim:

1. A control method for sensing transmission lubricant sump viscosity above a preselected value in a vehicular automated mechanical transmission system (10) comprising a throttle controlled engine (14), a mechanical change gear transmission (12) having a plurality of gear ratio combinations selectively engageable between a transmission input shaft (26) and output shaft (18), said transmission including a lubricant sump (70) in which a plurality of gears constantly drivingly engaged to said input shaft (64, 66, 68, 70, 72, 73) are at least partially submerged, and a selectively engageable and disengageable master friction clutch (16) drivingly interposed said engine and said transmission, said automated mechanical transmission system additionally comprising an information processing unit (44) having means for receiving a plurality of input signals including an input signal indicative of rotational speed of said transmission input shaft (38) and means for processing said input signals in accordance with predetermined logic rules for generating command output signals whereby said transmission system is operated in accordance with said logic rules, and means (32, 36, 40) associated with said transmission system effective to actuate said transmission system to effect engagement and disengagement of selected ones of said gear ratio combinations in response to said output signals from said processing unit, the method characterized by;
   causing the transmission to be shifted to neutral, then causing the rotational speed of the input shaft (IS) to be equal to or greater than a predetermined reference value (REF 1);
   then, while maintaining the transmission in neutral, disengaging the clutch and determining the value of a time derivative (dIS/dt) of the rotational speed of the input shaft; and
   comparing said value of the time derivative of the rotational speed of the input shaft to a second reference value (REF 2).

2. The control method of claim 1 wherein said logic routine is only performed during start up of said automated mechanical transmission system.

3. The control method of claims 1 or 2 wherein said time derivative is the first derivative with respect to time.

4. The control method of claims 1 or 2 wherein said second reference value is a value empirically determined for a known combination of transmission structure and rating of transmission lubricant.

5. A control method for sensing and responding to transmission lubricant sump viscosity above a preselected value in a vehicular automated mechanical transmission system (10) comprising a throttle controlled engine (14), a mechanical change gear transmission (12) having a plurality of gear ratio combinations selectively engageable between a transmission input shaft (26) and output shaft (18), said transmission including a lubricant sump (70) in which a plurality of gears constantly drivingly engaged to said input shaft (64, 66, 68, 70, 72, 73) are at least partially submerged, and a selectively engageable and disengageable master friction clutch (16) drivingly interposed said engine and said transmission, said automated mechanical transmission system additionally comprising an information processing unit (44) having means for receiving a plurality of input signals including an input signal indicative of rotational speed of said transmission input shaft (38) and means for processing said input signals in accordance with predetermined logic rules for generating command output signals whereby said transmission system is operated in accordance with said logic rules, and means (32, 36, 40) associated with said transmission system effective to actuate said transmission system to effect engagement and disengagement of selected ones of said gear ratio combinations in response to said output signals from said processing unit, the method characterized by;
   providing alternate high viscosity and non-high viscosity logic rules for said processing unit;
   causing the transmission to be shifted to neutral, then causing the rotational speed of the input shaft (IS) to be equal to or greater than a predetermined reference value (REF 1);
   then, while maintaining the transmission in neutral, disengaging the clutch and determining the value of a time derivative (dIS/dt) of the rotational speed of the input shaft; and
   comparing said value of the time derivative of the rotational speed of the input shaft to a second reference value (REF 2).

6. The control method of claim 5 comprising the additional step of; after implementation of said high viscosity logic rules for a predetermined period of time (T), automatically reverting back to non-high viscosity logic rules.

7. The control method of claim 6 wherein said time (T) is variable as a function of the value of said first time derivative.

8. The control method of claims 5, 6 or 7 wherein said change gear transmission is a synchronized change gear transmission.

9. The control method of claims 5, 6 or 7 wherein said logic routine is only performed during start up of said automated mechanical transmission system.

10. The control method of claims 5, 6 or 7 wherein said time derivative is the first derivative with respect to time.

11. The control method of claims 5, 6 or 7 wherein said second reference value is a value empirically determined for a known combination of transmission structure and rating of transmission lubricant.

12. A control system for sensing and reacting to transmission lubricant sump viscosity above a preselected value in a vehicular automated mechanical transmission system (10) comprising a throttle controlled engine (14), a mechanical change gear transmission (12) having a plurality of gear ratio combinations selectively engageable between a transmission input shaft (26) and output shaft (18), said transmission including a lubricant sump (70) in which a plurality of gears constantly drivingly engaged to said input shaft (64, 66, 68, 70, 72, 73) are at least partially submerged, and a selectively engageable and disengageable master friction clutch (16) drivingly interposed said engine and said transmission, said automated mechanical transmission system additionally comprising an information processing unit (44) having means for receiving a plurality of input signals including an input signal indicative of rotational speed of said transmission input shaft (38) and means for processing said input signals in accordance with predetermined logic rules for generating command output signals whereby said transmission system is operated in accordance with said logic rules, and means (32, 36, 40) associated with said transmission system effective to actuate said transmission system to effect engagement and disengagement of selected ones of said gear ratio combinations in response to said output signals from said processing unit, the system characterized by;

means defining alternate high viscosity and non-high viscosity logic rules for said processing unit;

means for causing the transmission to be shifted to neutral, then causing the rotational speed of the input shaft (IS) to be equal to or greater than a predetermined reference value (REF 1);

means for then, while maintaining the transmission in neutral, disengaging the clutch and determining the value of a time derivative (dIS/dt) of the rotational speed of the input shaft; and means for comparing said value of the time derivative of the rotational speed of the input shaft to a second reference value (REF 2) and, means effective if said value of said time derivative exceeds said reference value, for utilizing non-high viscosity logic rules and, if said value of said time derivative is less than said second reference value, for implementing high viscosity logic rules for control of said transmission.

13. The control system of claim 12 additionally comprising means effective after implementation of said high viscosity logic rules for a predetermined period of time (T), for automatically reverting back to non-high viscosity logic rules.

14. The control system of claim 13 wherein said time (T) is variable as a function of the value of said first time derivative.

15. The control system of claims 12, 13 or 14 wherein said change gear transmission is a synchronized change gear transmission.

16. The control system of claims 12, 13 or 14 wherein said system is only utilized during start up of said automated mechanical transmission system.

17. The control system of claims 12, 13 or 14 wherein said time derivative is the first derivative with respect to time.

18. The control method of claims 12, 13 or 14 wherein said second reference value is a value empirically determined for a known combination of transmission structure and rating of transmission lubricant.

* * * * *